(12) United States Patent
Weng

(10) Patent No.: US 7,556,434 B2
(45) Date of Patent: Jul. 7, 2009

(54) BEARING STRUCTURE

(76) Inventor: Rui-Hong Weng, No. 5, Lane 72, Kuei Yang St., Tai Shan Hsiang, Taipei Hsien (TW)

( * ) Notice: Subject to any disclaimer, the term of this patent is extended or adjusted under 35 U.S.C. 154(b) by 646 days.

(21) Appl. No.: 11/223,111

(22) Filed: Sep. 12, 2005

(65) Prior Publication Data

US 2006/0147132 A1    Jul. 6, 2006

(30) Foreign Application Priority Data

Jan. 4, 2005    (TW) .............................. 94200130 U

(51) Int. Cl.
*F16D 1/12* (2006.01)
*F16C 23/04* (2006.01)

(52) U.S. Cl. .................. 384/206; 403/137; 403/141; 403/143

(58) Field of Classification Search ................. 403/129, 403/132, 137, 138, 141, 143; 384/203, 206
See application file for complete search history.

(56) References Cited

U.S. PATENT DOCUMENTS 1,870,283 A  *  8/1932  Crawford ..................... 74/586

* cited by examiner

*Primary Examiner*—William C Joyce
(74) *Attorney, Agent, or Firm*—Rosenberg, Klein & Lee

(57) ABSTRACT

A bearing structure comprises a sphere, a base structure, and a plurality of adjusting elements. The base structure has an opening. The opening is abutted against a perimeter of the diameter of the sphere. The adjusting elements are disposed on two opposite edges of the base structure for adjusting the elasticity between the sphere and the base structure. The sphere rotates on the boarding structure freely so that a bearing structure with a universal rotating angle is formed.

6 Claims, 4 Drawing Sheets

BEARING STRUCTURE

BACKGROUND OF THE INVENTION

1. Field of the Invention

The present invention relates to a bearing structure, and more particularly, to a bearing structure with a universal rotating angle, which can change angles freely and is applied to a supporting shelf.

2. Description of the Related Art

Referring to FIG. 1, which is a conventional bearing structure, including a sphere 1a, a bottom seat 2a, a bearing seat 3a and a plurality of screws 4a. The sphere 1a has an end connected to a shaft 11a. The bottom seat 2a has a first groove 21a. The first groove 21a defines a through hole 211a at a central part thereof for receiving the sphere 1a. The shaft 11a penetrates the through hole 211a. The bearing seat 3a defines a second groove 31a at a bottom surface thereof. The second groove 31a is opposite to the first groove 21a so that the first groove 21a and the second groove 31a form a receiving space for mounting onto the sphere 1a tightly. The screws connect the bottom seat 2a and the bearing seat 3a together respectively. Thereby the bearing seat 3a can rotate on the sphere 1a freely.

However, the rotating angle of the bearing seat 3a is still restricted to the through hole 211a so that the bearing seat 3a cannot rotate around a large area. If the conventional bearing structure is improved by providing a bearing structure with a universal rotating angle, the user's needs will be meet.

SUMMARY OF THE INVENTION

It is therefore a principal object of the present invention to provide a bearing structure that can be applied to a supporting shelf. The bearing structure provides a wide range of rotating angles for the supporting shelf. The present invention has been accomplished to eliminate the aforesaid problem.

To achieve the above object, one feature of the present invention is to provide a bearing structure, including a sphere; a base structure having an opening abutted against a perimeter of the diameter of the sphere on a perimeter thereof; and a plurality of adjusting elements disposed on two opposite edges of the base structure respectively for adjusting the elasticity between the sphere and the base structure, whereby the sphere can rotate on the base structure freely so that if forms a bearing structure with a universal rotating angle.

To provide a further understanding of the invention, the following detailed description illustrates embodiments and examples of the invention, this detailed description being provided only for illustrating the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
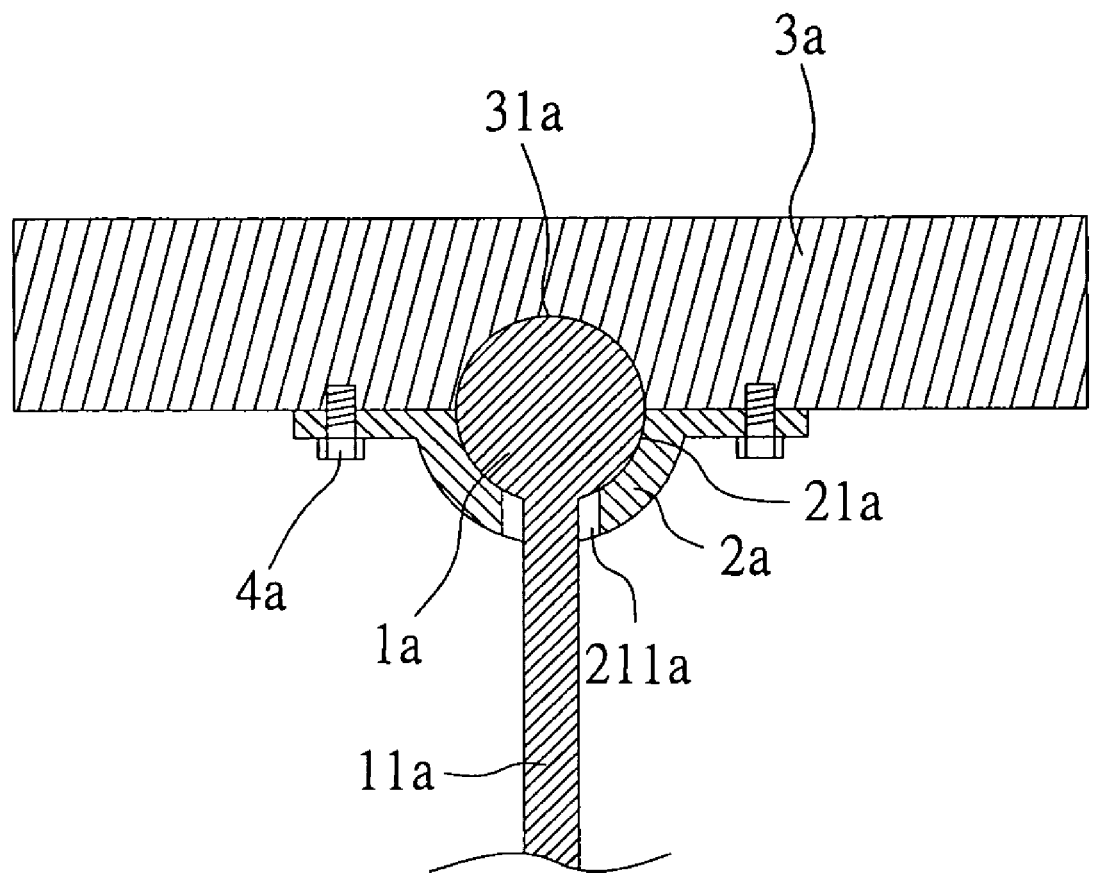
FIG. 1 is a cross-sectional view of a conventional bearing structure.
Figure 2:
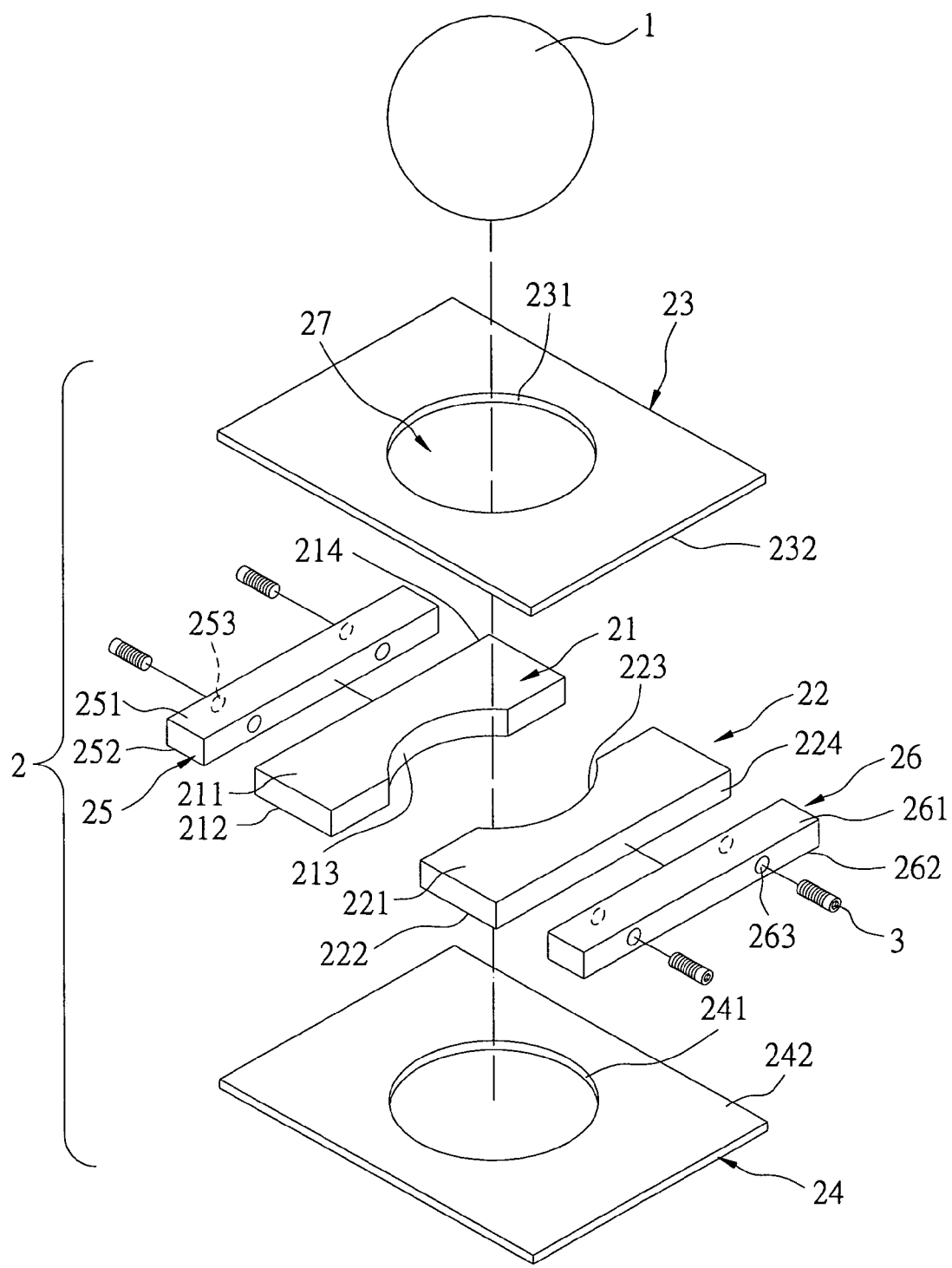
FIG. 2 is a decomposition view of the preferred embodiment of the present invention.
Figure 3:
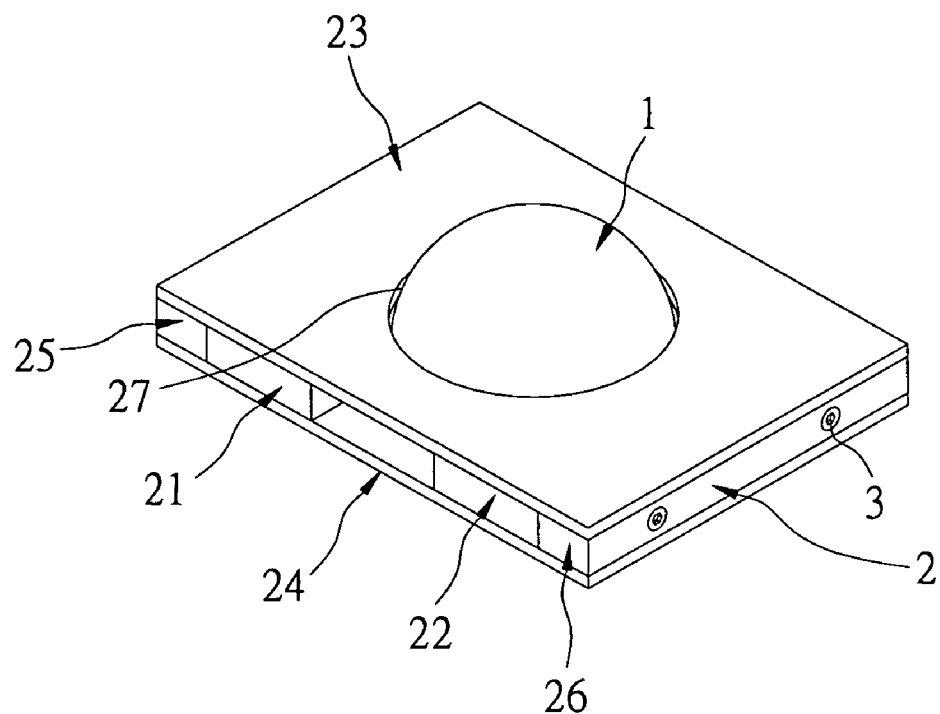
FIG. 3 is a composition view of the preferred embodiment of the present invention.

Referring now to the drawings wherein the showings are for the purposes of illustrating the preferred embodiments of the present invention only, and not for the purposes of limiting the same.

Referring to FIGS. 1 to 4, the present invention provides a bearing structure including a sphere 1, a base structure 2, and a plurality of adjusting elements 3.

The sphere 1 provides a pivotally connecting function for the bearing structure.

The base structure 2 has an opening 27. A perimeter of the opening 27 is abutted against a perimeter of the diameter of the sphere 1. The base structure 2 further comprises two clipping elements 21 and 22, two covering elements 23 and 24, and two tightening elements 25 and 26.

The two clipping elements are a first clipping element 21 and a second clipping element 22. A side edge of the first clipping element 21 and a side edge of the second clipping element 22 have a first clipping portion 213 and a second clipping portion 223 respectively. The first clipping portion 213 and the second clipping portion 223 are fitted to the outside surface of the sphere 1 respectively. The first clipping portion 213 and the second clipping portion 223 are clipped opposite on the perimeter of the diameter of the sphere 1.

The two covering elements are a first covering element 23 and a second covering element 24. The first covering element 23 is placed on a first top surface 211 of the first clipping element 21 and on a second top surface 221 of the second clipping element 22. The second covering element 24 is placed on a first bottom surface 212 of the first clipping element 21 and on a second bottom surface 222 of the second clipping element 22. The first covering element 23 and the second covering element 24 are disposed around the outside edge of the sphere 1. The first covering element 23 and the second covering element 24 have a first covering portion 231 and a second covering portion 241 respectively. The first covering portion 231 and the second covering element 241 are fitted to the outside surface of the sphere 1.

The two tightening elements are a first tightening element 25 and a second tightening element 26. The first tightening element 25 and the second tightening element 26 abut against a first side edge 214 of the first clipping element 21 and a second side edge 224 of the second clipping element 22 respectively. A third top surface 251 and a third bottom surface 252 of the first tightening element 25 connect to a first side face 232 of the first covering element 23 and a second side face 242 of the second covering element 24 respectively. A fourth top surface 261 and a fourth bottom surface 262 of the second tightening element 26 also connect to the first side face 232 of the first covering element 23 and the second side face 242 of the second covering element 24 respectively. The first tightening element 25 defines a plurality of penetrated holes 253 on a side edge thereof. The second tightening element 26 also defines a plurality of penetrated holes 263 on a side edge thereof.

Figure 4:
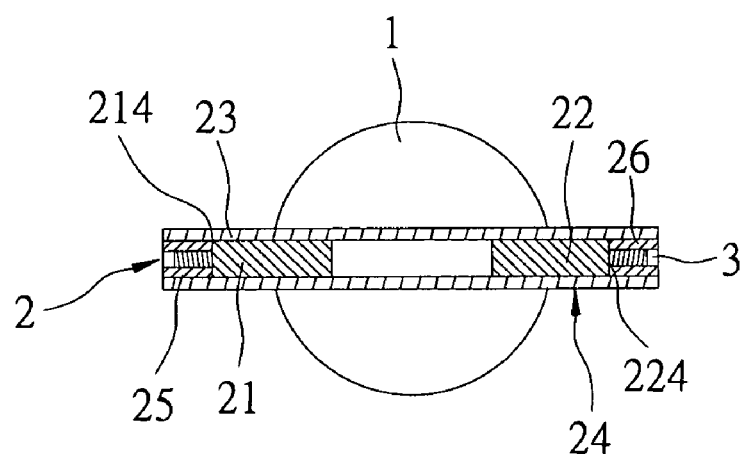
FIG. 4 is a cross-sectional view of the preferred embodiment of the present invention.

The adjusting elements 3 are disposed on two opposite edges of the boarding structure 2 respectively. Each of the adjusting elements 3 has an end that penetrates each of the penetrated holes 253 and 263, respectively, and pushes the first side edge 214 of the first clipping element 21 and the second side edge 224 of the second clipping element 22, respectively, as shown in FIG. 4. In this way, the first clipping portion 213 of the first clipping element 21 and the second clipping portion 223 of the second clipping element 22 are tightened and abutted against the perimeter of the diameter of the sphere 1 to adjust the elasticity between the sphere 1 and the boarding structure 2. The sphere 1 rotates on the base structure 2 freely so that it forms a bearing structure with a universal rotating angle.

Figure 5:
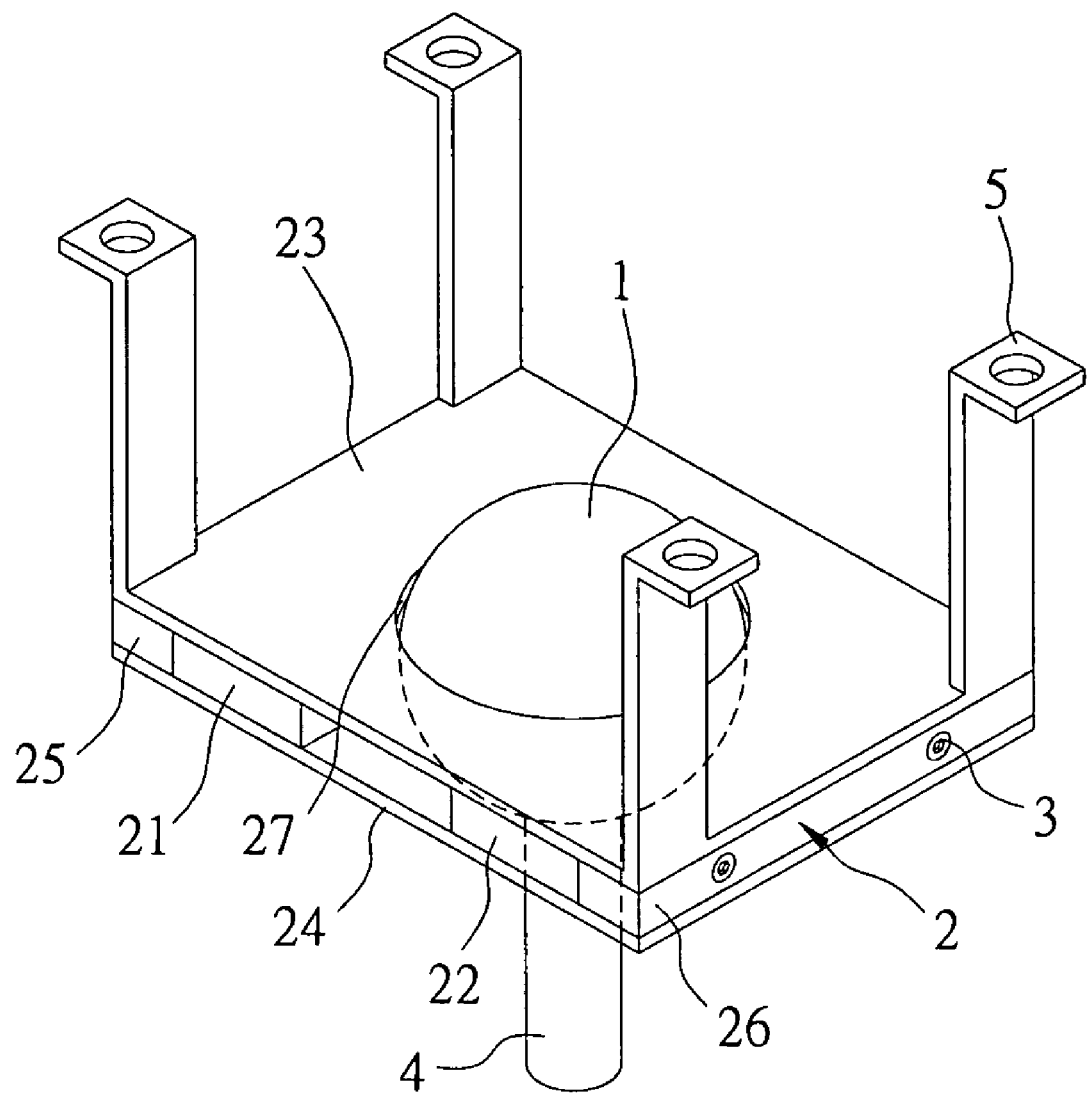
FIG. 5 is a composition view of the preferred embodiment of the present invention in use.

Please refer to FIG. 5, which is a composition view of the preferred embodiment of the present invention in use. The sphere 1 is further connected to a shaft 4 at an end thereof, and the base structure 2 further defines a plurality of supporting arms 5 on a surface thereof, whereby a supporting shelf for supporting an object is formed. Therefore, the supporting shelf can rotate within a wide range of a rotating angle.

So, the present invention has the following characteristics:

1. The sphere 1 is pivotally connected to the opening 27 of the base structure 2. The perimeter of the opening 27 is abutted against the perimeter of the diameter of the sphere 1. Therefore, the sphere 1 can rotate on the base structure 2 freely so that a bearing structure with a universal rotating angle is formed.
2. The adjusting elements 3 are disposed on the two opposite edges of the base structure 2 respectively to adjust the elasticity between the sphere 1 and the base structure 2. Therefore, the adjusting elements 3 provide an adjusting function for the bearing structure.

There has thus been described a new, novel and heretofore unobvious bearing structure eliminating the aforesaid problem of the prior art. Furthermore, those skilled in the art will readily appreciate that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A bearing structure, comprising:
   a sphere;
   a substantially planar base structure having a height smaller than the sphere diameter, said base structure having an opening defined therein and abutted against an outer surface of the sphere at a perimeter thereof, wherein said base structure further includes:
   (a) a pair of clipping elements receiving said sphere between respective proximal sides thereof, each of said pair of clipping elements having substantially flat opposite top and bottom surfaces, and a side edge extending between said top and bottom surfaces at a distal side thereof,
   (b) a pair of tightening elements, each having respective top and bottom surfaces and abutting against said side edge of a respective one of said pair of clipping elements, and
   (c) a pair of substantially planar covering elements sandwiching said pair of clipping elements and said pair of tightening elements therebetween, each of said pair of covering elements having an opening formed therein, wherein, when said each substantially planar covering element is attached to a respective one of said top and bottom surfaces of said pair of clipping elements and in contact with a respective one of said top and bottom surfaces of said pair of tightening elements, a respective portion of said sphere extends externally said base structure beyond each of said pair of substantially planar covering elements through said opening formed therein; and
   a plurality of adjusting elements disposed at two opposite edges of the base structure in operative coupling with each of said pair of tightening elements, said adjusting elements adjusting a distance between said clipping elements, thereby adjusting the elasticity between the sphere and the base structure, thereby permitting a substantially unrestricted rotation of the sphere in the base structures, thus resulting in a bearing structure with a universal rotating angle.

2. The bearing structure of claim 1 wherein each of the two clipping elements has a clipping portion defined at said proximal side thereof, the clipping portion accommodates the outside surface of the sphere.

3. The bearing structure of claim 1 wherein each of the two covering elements has a covering portion circumferentially contouring said opening and engaging with the outside surface of the sphere.

4. The bearing structure of claim 1, wherein each of the two tightening elements has a plurality of penetrated holes defined at a side thereof.

5. The bearing structure of claim 4, wherein each of the adjusting elements has an end passing through a respective one of the penetrated holes and tightening each of the two clipping elements with respect to the surface of the sphere.

6. The bearing structure of claim 1, wherein the sphere is further connected to a shaft at an end thereof, and wherein the base structure further includes a plurality of supporting arms on a surface thereof, thereby forming a supporting shelf for supporting an object.

* * * * *